United States Patent
Sun et al.

(10) Patent No.: US 12,249,075 B2
(45) Date of Patent: Mar. 11, 2025

(54) METHOD AND APPARATUS OF PROCESSING IMAGE

(71) Applicant: Infervision Medical Technology Co., Ltd., Beijing (CN)

(72) Inventors: Yanfeng Sun, Beijing (CN); Shaokang Wang, Beijing (CN); Kuan Chen, Beijing (CN)

(73) Assignee: Infervision Medical Technology Co., Ltd., Beijing (CN)

( * ) Notice: Subject to any disclaimer, the term of this patent is extended or adjusted under 35 U.S.C. 154(b) by 470 days.

(21) Appl. No.: 17/676,133

(22) Filed: Feb. 19, 2022

(65) Prior Publication Data
US 2022/0375091 A1 Nov. 24, 2022

(30) Foreign Application Priority Data

May 20, 2021 (CN) .......................... 202110555360.8

(51) Int. Cl.
*G06T 7/11* (2017.01)
*G06V 10/764* (2022.01)
*G06V 20/70* (2022.01)

(52) U.S. Cl.
CPC .............. *G06T 7/11* (2017.01); *G06V 10/764* (2022.01); *G06V 20/70* (2022.01); *G06T 2207/20081* (2013.01); *G06T 2207/30012* (2013.01); *G06V 2201/033* (2022.01)

(58) Field of Classification Search
CPC ............ G06T 7/11; G06T 2207/20081; G06T 2207/30012; G06V 20/70; G06V 10/764; G06V 2201/033
USPC ....................................................... 382/128
See application file for complete search history.

(56) References Cited

U.S. PATENT DOCUMENTS

| | | | |
|---|---|---|---|
| 2017/0224302 A1 | 8/2017 | Berg et al. | |
| 2018/0374209 A1* | 12/2018 | Patil ...................... | G06N 3/084 |
| 2022/0198775 A1* | 6/2022 | Yuan ...................... | G06V 10/25 |

FOREIGN PATENT DOCUMENTS

| | | |
|---|---|---|
| CN | 107798682 A | 3/2018 |
| CN | 109949316 A | 6/2019 |
| CN | 111080573 A | 4/2020 |
| CN | 111161268 A | 5/2020 |

(Continued)

OTHER PUBLICATIONS

Apiparakoon et al., MaligNet: Semisupervised Learning for Bone Lesion Instance Segmentation Using Bone Scintigraphy, IEEE Engineering in Medicine and Biology Society Section, pp. 27047-27066, vol. 8, dated Feb. 3, 2020.

(Continued)

*Primary Examiner* — Michael R Neff
(74) *Attorney, Agent, or Firm* — Westbridge IP LLC

(57) ABSTRACT

Disclosed are a method and an apparatus of processing image. The method includes: obtaining an initial bone segmentation result; and fusing the initial bone segmentation result based on characteristics of and correspondences between a plurality of bone segmentation results in the initial bone segmentation result, to obtain a target bone segmentation result. The initial bone segmentation result includes the plurality of bone segmentation results generated by a plurality of different deep learning models. Methods in the embodiments of the present application can improve precision of a fusion result of the plurality of bone segmentation results.

18 Claims, 8 Drawing Sheets

(56) References Cited

FOREIGN PATENT DOCUMENTS

| CN | 112258524 A | 1/2021 |
|---|---|---|
| CN | 112489005 A | 3/2021 |
| DE | 102015207727 A1 | 11/2016 |

OTHER PUBLICATIONS

First Office Action issued in counterpart Chinese Patent Application No. 202110555360.8, dated Nov. 3, 2021.

\* cited by examiner

Left-right partition interface    Front-back partition interface

Left-right partition interface    Front-back partition interface

Apparatus 1400 Of Processing Image

METHOD AND APPARATUS OF PROCESSING IMAGE

CROSS-REFERENCE TO RELATED APPLICATIONS

This application claims priority to Chinese Patent Application No. 202110555360.8 filed on May 20, 2021. The application is incorporated herein by reference in its entirety.

TECHNICAL FIELD

The present application relates to the field of medical image processing, and in particular to a method and an apparatus of processing image.

BACKGROUND

Medical images can often reflect current physical condition of patients. For example, a medical image such as Computed Tomography (CT) and the like has been widely used in cases of disease diagnosis, precise treatment, preoperative analysis, intraoperative guidance and the like.

With the rapid development of deep learning methods and image processing technologies, image processing methods based on deep learning have also developed rapidly in the medical field. Many researchers have begun to study and develop various bone segmentation models.

SUMMARY

In view of this, embodiments of the present application aim to provide a method and an apparatus of processing image, to resolve a problem in the prior art that a fusion result of a plurality of bone segmentation results has low precision.

According to a first aspect, a method of processing image is provided. The method includes: obtaining an initial bone segmentation result; and fusing the initial bone segmentation result based on characteristics of and correspondences between a plurality of bone segmentation results in the initial bone segmentation result, to obtain a target bone segmentation result. The initial bone segmentation result includes the plurality of bone segmentation results generated by a plurality of different deep learning models In the embodiments of the present application, the initial bone segmentation result is generated by the plurality of different deep learning models. The initial bone segmentation result is fused based on characteristics of and correspondences between the plurality of bone segmentation results in the initial bone segmentation result, so that problems existing in the plurality of bone segmentation results may be handled in a targeted manner, and thus precision of a fusion result of the plurality of bone segmentation results may be improved.

In an embodiment, the initial bone segmentation result includes more of a bone classification result, a rib classification result, a rib instance segmentation result, a vertebral segment instance segmentation result, a vertebral segment key point, and an intervertebral disc plane.

In an embodiment, in a case that the initial bone segmentation result includes the bone classification result and the rib instance segmentation result, the fusing the initial bone segmentation result based on characteristics of and correspondences between the plurality of bone segmentation results in the initial bone segmentation result, to obtain a target bone segmentation result includes: mapping the rib instance segmentation result to a rib part in the bone classification result, to obtain a candidate bone classification result; and determining the target bone segmentation result according to the candidate bone classification result.

In an embodiment, in a case that the initial bone segmentation result includes the rib classification result, the determining the target bone segmentation result according to the candidate bone classification result includes: determining, according to the rib classification result, the candidate bone classification result, and a correspondence between the rib classification result and the candidate bone classification result, first initial label information of each rib in the target bone segmentation result. The first initial label information is configured to indicate each rib and sequence thereof.

In the embodiment of the present application, each rib instance and actual sequence thereof are derived according to rib classification information (in the rib classification result), the rib instance information (in the candidate bone classification result), and a correspondence between the rib classification information and the rib instance information, thereby helping improve precision of each rib instance and actual sequence thereof.

In an embodiment, in a case that the initial bone segmentation result includes the vertebral segment instance segmentation result, the method further includes: determining, according to the rib instance segmentation result and the vertebral segment instance segmentation result, second initial label information of each vertebral segment in the target bone segmentation result. The second initial label information is configured to indicate each vertebral segment and sequence thereof.

In the embodiment of the present application, each vertebral segment instance and actual sequence thereof are derived according to a relationship between rib instance information (in the rib instance segmentation result) and vertebral segment instance information (in the vertebral segment instance segmentation result), thereby helping improve precision of each vertebral segment instance and actual sequence thereof.

In an embodiment, the method further includes: correcting the first initial label information and the second initial label information, to obtain first label information and second label information. The first label information is configured to indicate each rib obtained after correction and sequence thereof. The second label information is configured to indicate each vertebral segment obtained after correction and sequence thereof.

In an embodiment, the method further includes: relabeling each rib in the first label information, each vertebral segment in the second label information, a scapula, a sternum, and a clavicle in the target bone segmentation result according to a preset labeling rule.

In an embodiment, in a case that the initial bone segmentation result includes the vertebral segment key point and the intervertebral disc plane, the method further includes: restoring a sacrum coccyx in the target bone segmentation result according to a vertebra in the bone classification result, the vertebral segment key point, and the intervertebral disc plane.

In an embodiment, the method further includes: calculating a volume of an independent connected domain corresponding to each part in the bone classification result and the vertebral segment instance segmentation result; and removing a part whose volume does not meet a preset condition.

In the embodiment of the present application, a finely divided part (namely, the part whose volume does not meet the preset condition) is removed from the bone classification result and the vertebral segment instance segmentation result, thereby improving precision of a fusion result of the plurality of bone segmentation results.

In an embodiment, the method further includes: determining, according to a sternum and a vertebra in the bone classification result, each bone in the target bone segmentation result, a front-back partition interface, and a left-right partition interface. The front-back partition interface is configured to divide each bone into a front part and a back part, and the left-right partition interface is configured to divide each bone into a left part and a right part.

According to a second aspect, an apparatus of processing image is provided. The apparatus includes an obtaining unit and a fusion unit. The obtaining unit is configured to obtain an initial bone segmentation result. The initial bone segmentation result includes a plurality of bone segmentation results generated by a plurality of different deep learning models. The fusion unit is configured to fuse the initial bone segmentation result based on characteristics of and correspondences between the plurality of bone segmentation results in the initial bone segmentation result, to obtain a target bone segmentation result.

In the embodiment of the present application, the initial bone segmentation result is generated by the plurality of different deep learning models. The initial bone segmentation result is fused based on characteristics of and correspondences between the plurality of bone segmentation results in the initial bone segmentation result, so that problems existing in the plurality of bone segmentation results may be handled in a targeted manner, and thus precision of a fusion result of the plurality of bone segmentation results may be improved.

In an embodiment, the initial bone segmentation result includes more of a bone classification result, a rib classification result, a rib instance segmentation result, a vertebral segment instance segmentation result, a vertebral segment key point, and an intervertebral disc plane.

In an embodiment, in a case that the initial bone segmentation result includes the bone classification result and the rib instance segmentation result, the fusion unit is specifically configured to map the rib instance segmentation result to a rib part in the bone classification result, to obtain a candidate bone classification result; and determine the target bone segmentation result according to the candidate bone classification result.

In an embodiment, in a case that the initial bone segmentation result includes the rib classification result, the fusion unit is specifically configured to: determine, according to the rib classification result, the candidate bone classification result, and a correspondence between the rib classification result and the candidate bone classification result, first initial label information of each rib in the target bone segmentation result. The first initial label information is configured to indicate each rib and sequence thereof.

In the embodiment of the present application, each rib instance and actual sequence thereof are derived according to rib classification information (in the rib classification result), the rib instance information (in the candidate bone classification result), and a correspondence between the rib classification information and the rib instance information, thereby helping improve precision of each rib instance and actual sequence thereof.

In an embodiment, in a case that the initial bone segmentation result includes the vertebral segment instance segmentation result, the apparatus further includes a determining unit. The determining unit is configured to determine, according to the rib instance segmentation result and the vertebral segment instance segmentation result, second initial label information of each vertebral segment in the target bone segmentation result. The second initial label information is configured to indicate each vertebral segment and sequence thereof.

In the embodiment of the present application, each vertebral segment instance and actual sequence thereof are derived according to a relationship between rib instance information (in the rib instance segmentation result) and vertebral segment instance information (in the vertebral segment instance segmentation result), thereby helping improve precision of each vertebral segment instance and actual sequence thereof.

In an embodiment, the apparatus further includes a correction unit. The correction unit is configured to correct the first initial label information and the second initial label information, to obtain first label information and second label information. The first label information is configured to indicate each rib obtained after correction and sequence thereof. The second label information is configured to indicate each vertebral segment obtained after correction and sequence thereof.

In an embodiment, the apparatus further includes a labeling unit. The labeling unit is configured to relabel each rib in the first label information, each vertebral segment in the second label information, a scapula, a sternum, and a clavicle in the target bone segmentation result according to a preset labeling rule.

In an embodiment, in a case that the initial bone segmentation result includes the vertebral segment key point and the intervertebral disc plane, the apparatus further includes a restoration unit. The restoration unit is configured to restore a sacrum coccyx in the target bone segmentation result according to a vertebra in the bone classification result, the vertebral segment key point, and the intervertebral disc plane.

In an embodiment, the apparatus further includes a calculation unit and a removal unit. The calculation unit is configured to calculate a volume of an independent connected domain corresponding to each part in the bone classification result and the vertebral segment instance segmentation result. The removal unit is configured to remove a part whose volume does not meet a preset condition.

In the embodiment of the present application, a finely divided part (namely, the part whose volume does not meet the preset condition) is removed from the bone classification result and the vertebral segment instance segmentation result, thereby improving precision of a fusion result of the plurality of bone segmentation results.

In an embodiment, the apparatus further includes a division unit. The division unit is configured to determine, according to a sternum and a vertebra in the bone classification result, each bone in the target bone segmentation result, a front-back partition interface, and a left-right partition interface. The front-back partition interface is configured to divide each bone into a front part and a back part, and the left-right partition interface is configured to divide each bone into a left part and a right part.

According to a third aspect, an apparatus of processing image is provided. The apparatus includes a storage medium and a central processing unit. The storage medium may be a nonvolatile storage medium, and stores a computer executable program. The central processing unit is connected to the nonvolatile storage medium, and executes the computer executable program to implement the method according to the first aspect or any possible implementation of the first aspect.

According to a fourth aspect, a chip is provided. The chip includes a processor and a data interface. The processor reads instructions stored in a memory through the data interface, and executes the method according to the first aspect or any possible implementation of the first aspect.

Optionally, in an implementation, the chip may further include a memory. The memory stores the instructions. The processor is configured to execute the instructions stored in the memory. When the instructions are executed, the processor is configured to execute the method according to the first aspect or any possible implementation of the first aspect.

According to a fifth aspect, a computer-readable storage medium is provided. The computer-readable storage medium stores program code used by a device for execution. The program code includes instructions for executing the method according to the first aspect or any possible implementation of the first aspect.

In the embodiments of the present application, the initial bone segmentation result is generated by the plurality of different deep learning models. The initial bone segmentation result is fused based on characteristics of and correspondences between the plurality of bone segmentation results in the initial bone segmentation result, so that problems existing in the plurality of bone segmentation results may be handled in a targeted manner, and thus precision of a fusion result of the plurality of bone segmentation results may be improved.

DETAILED DESCRIPTION

The following clearly describes technical solutions in embodiments of the present application with reference to accompanying drawings in the embodiments of the present application. Apparently, the described embodiments are merely some but not all of the embodiments of the present application. All other embodiments obtained by a person skilled in the art based on the embodiments of the present application without creative efforts shall fall within the protection scope of the present application.

Methods in the embodiments of the present application may be applied to various scenarios where bone segmentation results output by a plurality of deep learning models need to be fused, which is not limited in the embodiments of the present application.

Figure 1:
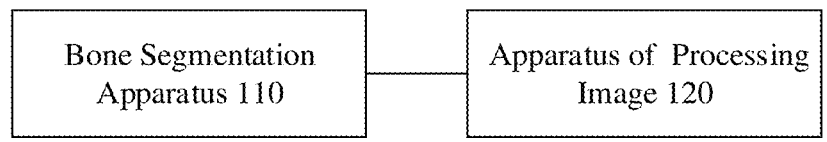
FIG. 1 is a diagram of an application scenario applicable to an embodiment of the present application.

FIG. 1 is a diagram of an application scenario applicable to an embodiment of the present application.

It should be noted that, the application scenario shown in FIG. 1 is only an example but not a limitation. The application scenario shown in FIG. 1 may include more or less apparatuses or devices, which is not limited in the embodiment of the present application.

The application scenario 100 in FIG. 1 may include a bone segmentation apparatus 110 and an apparatus 120 of processing image.

The bone segmentation apparatus 110 may include various models used for bone segmentation, such as a bone classification model, a rib classification model, a rib instance segmentation model, and a vertebral segment instance segmentation model.

The apparatus 120 of processing image may be a computer, a terminal device, a server (for example, a cloud server), or another apparatus or device that can process the plurality of bone segmentation results.

In the embodiment of the present application, the bone segmentation apparatus 110 may perform bone segmentation processing based on a medical image to obtain a bone segmentation result.

The bone segmentation apparatus 110 may include various bone segmentation models, for example, a bone classification model, a rib classification model, a rib instance segmentation model, and a vertebral segment instance segmentation model.

For example, the bone segmentation apparatus 110 includes the rib classification model. The rib classification model may perform rib classification processing based on a medical image to obtain a rib classification result.

It should be noted that, the medical image herein may include a Computed Tomography (CT) image, a Magnetic Resonance Imaging (MRI) image, or another image that is applied to the medical field, which is not limited in the embodiment of the present application.

In an embodiment of the present application, the apparatus 120 of processing image may fuse the plurality of bone segmentation results output by the bone segmentation apparatus 110.

For example, the apparatus 120 of processing image may be a computer device. The computer device may be a general-purpose computer, a computer apparatus composed of an application-specific integrated circuit, or the like, which is not limited in the embodiment of the present application.

A person skilled in the art may know that the computer device may be one or a plurality of computer devices. The plurality of computer devices may be of a same type or different types. A quantity and types of the computer device are not limited in the embodiment of the present application.

For example, the computer device may fuse the plurality of bone segmentation results output by the bone segmentation apparatus 110 to obtain a target bone segmentation result.

The bone segmentation results may include more of a bone classification result, a rib classification result, a rib instance segmentation result, a vertebral segment instance segmentation result, a vertebral segment key point, and an intervertebral disc plane.

The computer device may be a server or cloud server, and may directly fuse the plurality of bone segmentation results to obtain the target bone segmentation result.

Alternatively, the computer device may be connected to a server (not shown in FIG. 1) by using a communications network. The computer device may send, to the server, the plurality of bone segmentation results and the like obtained from the bone segmentation apparatus 110. The server fuses the plurality of bone segmentation results to obtain the target bone segmentation result.

Currently, researchers have begun to study and develop various bone segmentation models, for example, a bone classification model, a rib classification model, a rib instance segmentation model, and a vertebral segment instance segmentation model. However, results output by these models generally can indicate only one type of specific information (or referred to as results). For example, the bone classification model can output only bone classification results, and the rib instance segmentation model can output only rib instance segmentation results.

For ease of subsequent medical diagnosis and analysis, it is hoped that a high-precision bone segmentation model that can indicate a plurality of types of information can be obtained. However, currently, a fusion result obtained based on results output by a plurality of models usually has low precision.

Based on the foregoing problem, the embodiments of the present application provide a method and an apparatus of processing image, which may resolve problems existing in the plurality of bone segmentation results in a targeted manner, so that precision of a fusion result of the plurality of bone segmentation results can be improved.

The following describes the method in the embodiments of the present application in detail with reference to FIG. 2 to FIG. 13.

Figure 2:
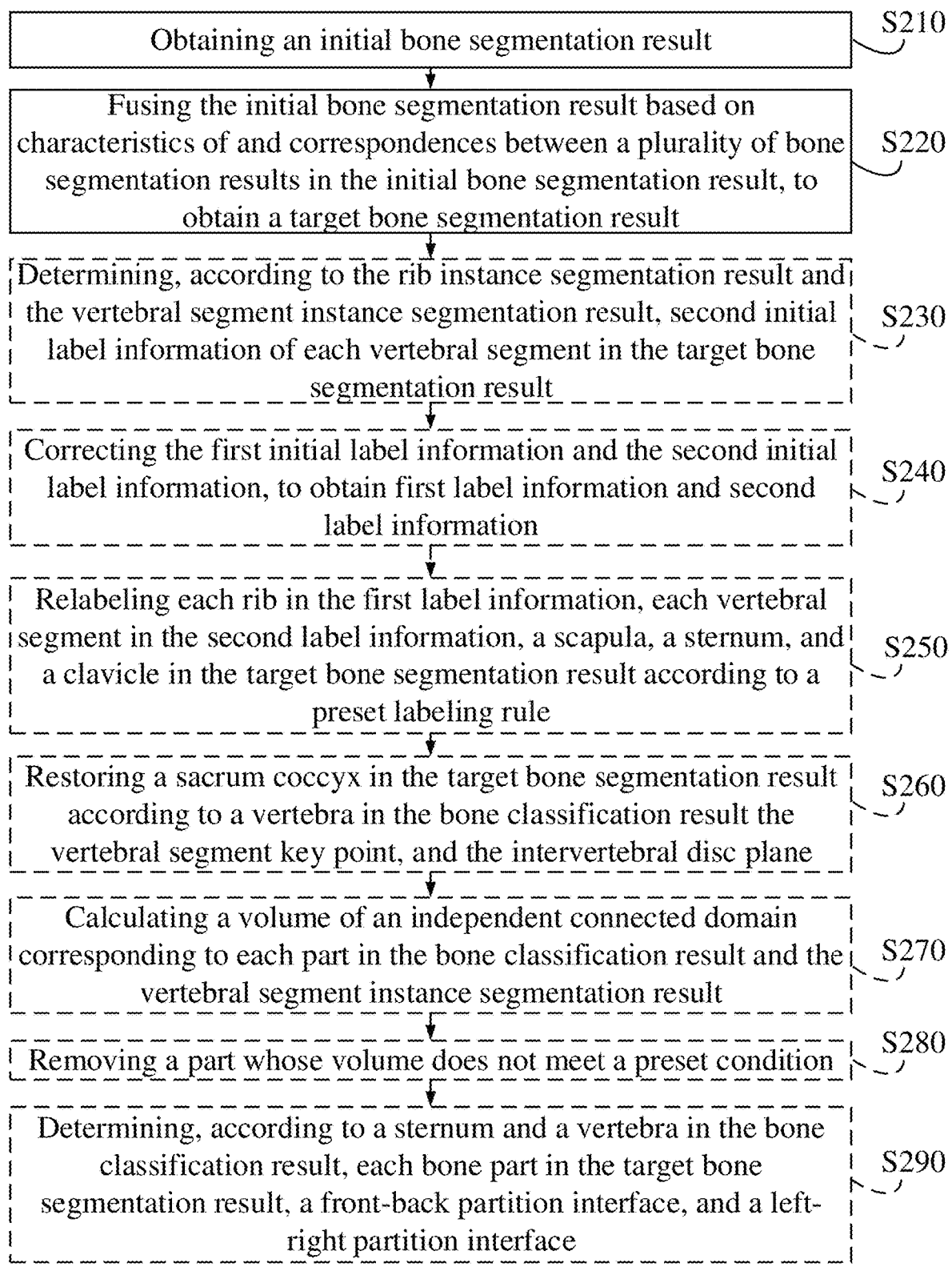
FIG. 2 is a schematic block diagram of a method of processing image in an embodiment of the present application.

FIG. 2 is a schematic block diagram of a method 200 of processing image in an embodiment of the present application. The method 200 may be executed by the apparatus 120 of processing image in FIG. 1.

It should be understood that, FIG. 2 shows steps or operations of the method 200, but these steps or operations are only examples. In the embodiments of the present application, another operation or a variation of each operation of the method 200 in FIG. 2 may also be performed. Alternatively, not all steps need to be performed, or these steps may be executed in another sequence.

S210: Obtaining an initial bone segmentation result.

The initial bone segmentation result includes a plurality of bone segmentation results generated by a plurality of different deep learning models.

Optionally, the initial bone segmentation result may include more of a bone classification result, a rib classification result, a rib instance segmentation result, a vertebral segment instance segmentation result, a vertebral segment key point, and an intervertebral disc plane.

For example, the bone classification result may be a bone 6 classification mask, the rib classification result may be a rib 12 classification mask, the rib instance segmentation result may be a rib instance segmentation mask, the vertebral segment instance segmentation result may be a vertebral segment instance segmentation mask, the vertebral segment key point may be key point sequence of a vertebral segment, and the intervertebral disc plane may indicate a plane where an intervertebral disc is located.

Optionally, the initial bone segmentation result may also include a bone segmentation result generated by another model (for example, another non-deep learning model), which is not limited in the embodiment of the present application.

S220: Fusing the initial bone segmentation result based on characteristics of and correspondences between a plurality of bone segmentation results in the initial bone segmentation result, to obtain a target bone segmentation result.

Optionally, in a case that the initial bone segmentation result includes the bone classification result and the rib instance segmentation result, the S220 may include: mapping the rib instance segmentation result to a rib part in the bone classification result, to obtain a candidate bone classification result; and determining the target bone segmentation result according to the candidate bone classification result.

The candidate bone classification result may include rib instance information. The rib instance information is configured to indicate a plurality of rib instances.

Further, cross color existing in the candidate bone classification result may be corrected.

For example, different instance labels may be configured to indicate different ribs in the rib instances. Generally, it is assumed that different ribs have different colors, that is, it may be considered that one instance label corresponds to one color (namely, one rib).

In this case, as for each rib in the candidate bone classification result, if there are a plurality of parts corresponding to different instance labels on a rib, it may be considered that the rib is cross-colored.

During correction of cross color existing in the candidate bone classification result, color distribution of each rib in the candidate bone classification result may be determined. If there are a plurality of colors on one rib, statistics on volumes of parts respectively corresponding to various colors may be collected, to determine a part whose volume is the largest, and colors of other parts are all set to be the color of the part whose volume is the largest.

Optionally, in a case that the initial bone segmentation result includes the rib classification result, the determining the target bone segmentation result according to the candidate bone classification result may include: determining, according to the rib classification result, the candidate bone classification result, and a correspondence between the rib classification result and the candidate bone classification result, first initial label information of each rib in the target bone segmentation result.

The first initial label information may be configured to indicate each rib and sequence thereof.

For example, a category with the highest confidence may be selected from the rib classification result, and actual categories of a plurality of ribs are determined according to the category with the highest confidence.

Further, rib instance information in the candidate bone classification result may be determined, and correspondences between the plurality of rib instances (indicated by the rib instance information) and the actual categories of the plurality of ribs may be determined.

In this case, each rib and sequence thereof (for example, the first initial label information configured to indicate each rib and sequence thereof) in the target bone segmentation result may be determined according to the correspondences between the plurality of rib instances and the actual categories of the plurality of ribs.

Optionally, the first initial label information may also be corrected when an error occurs on the first initial label information.

For example, when a total quantity of ribs (indicated by the first initial label information) is less than or equal to 12 and a label of the first rib is not equal to 1, category labels of all ribs may be shifted until the first rib is rib 1 (for example, ribs −1 to 9 are shifted to be rib 1 to rib 11).

Correspondingly, in this case, the first initial label information obtained after the correction may be used as first initial label information of each rib in the target bone segmentation result.

Optionally, in a case that the initial bone segmentation result includes the vertebral segment instance segmentation result, the method 200 may further include the following step S230.

S230: Determining, according to the rib instance segmentation result and the vertebral segment instance segmentation result, second initial label information of each vertebral segment in the target bone segmentation result.

The second initial label information may be configured to indicate each vertebral segment and sequence thereof.

The vertebral segment instance segmentation result may include vertebral segment instance information. The vertebral segment instance information is configured to indicate a plurality of vertebral segment instances.

For example, one rib may be selected, and instance information of the one rib is determined from the target bone segmentation result.

Further, a vertebral segment label corresponding to the rib may be determined, and each vertebral segment and sequence thereof (namely, the second initial label information) may be determined according to the vertebral segment instance information in the vertebral segment instance segmentation result.

Optionally, the method 200 may further include the following step S240.

S240: Correcting the first initial label information and the second initial label information, to obtain first label information and second label information.

The first label information may be configured to indicate each rib and sequence thereof. The second label information may be configured to indicate each vertebral segment and sequence thereof.

Optionally, the method 200 may further include the following step S250.

S250: Relabeling each rib in the first label information, each vertebral segment in the second label information, a scapula, a sternum, and a clavicle in the target bone segmentation result according to a preset labeling rule.

For example, a relabeled first label information may not only indicate each rib and sequence thereof, but also be configured to distinguish between a left rib and a right rib.

For example, a relabeled second label information may not only indicate each vertebral segment and sequence thereof, but also be configured to distinguish between a cervical vertebra, a thoracic vertebra, a lumbar vertebra, and a sacrum coccyx.

A relabeled scapula may also be configured to distinguish between a left scapula and a right scapula.

A relabeled clavicle may also be configured to distinguish between a left clavicle and a right clavicle.

In the embodiment of the present application, the preset labeling rule is only an example but not a limitation. A specific labeling rule is not limited in the present application.

Optionally, in a case that the initial bone segmentation result includes the vertebral segment key point and the intervertebral disc plane, the method 200 may further include the following step S260.

S260: Restoring a sacrum coccyx in the target bone segmentation result according to a vertebra in the bone classification result the vertebral segment key point, and the intervertebral disc plane.

Optionally, the sacrum coccyx in the bone classification result may be determined according to the vertebral segment key point and the intervertebral disc plane and corrected, and then a corrected sacrum coccyx may be configured to replace the sacrum coccyx in the target bone segmentation result.

For example, an opening operation with the core of [1,1,1] may be performed for the sacrum coccyx, to remove distribution of finely divided parts in the sacrum coccyx, thereby implementing correction of the sacrum coccyx.

Optionally, the method 200 may further include steps S270 and S280.

S270: Calculating a volume of an independent connected domain corresponding to each part in the bone classification result and the vertebral segment instance segmentation result.

S280: Removing a part whose volume does not meet a preset condition.

For example, the foregoing steps S270 and S280 may be performed in sequence on the clavicle, the sternum, and the scapula in the bone classification result, and a processed clavicle, a processed sternum, and a processed scapula are respectively configured to replace corresponding bone parts in the bone classification result.

For another example, the foregoing steps S270 and S280 may also be performed in sequence on each vertebral segment in the vertebral segment instance segmentation result, and each processed vertebral segment is configured to replace a corresponding bone part in the vertebral segment instance segmentation result.

Optionally, the method 200 may further include the following step S290.

S290: Determining, according to a sternum and a vertebra in the bone classification result, each bone part in the target bone segmentation result, a front-back partition interface, and a left-right partition interface.

The front-back partition interface may be configured to divide each bone into a front part and a back part, and the left-right partition interface may be configured to divide each bone into a left part and a right part.

Figure 3:
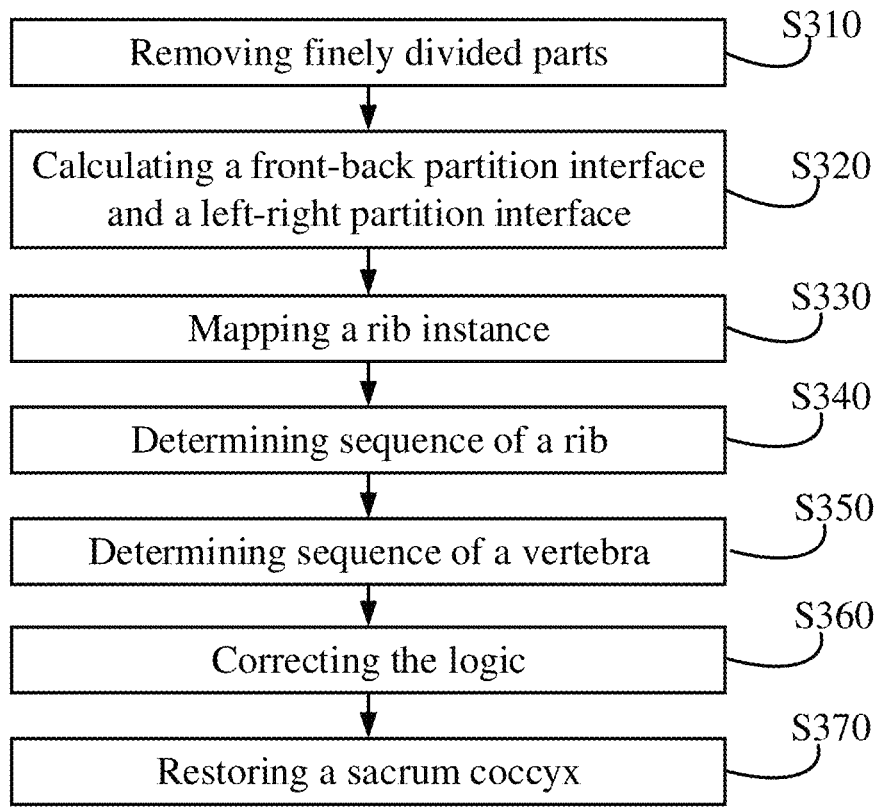
FIG. 3 is a schematic block diagram of a method of processing image in another embodiment of the present application.

FIG. 3 is a schematic block diagram of a method 300 of processing image in an embodiment of the present application. The method 300 may be performed by the apparatus 120 of processing image in FIG. 1.

It should be understood that, FIG. 3 shows steps or operations of the method 300, but these steps or operations are only examples. In the embodiment of the present application, other operations or a variation of each operation of the method 300 in FIG. 3 may also be executed. Alternatively, not all steps need to be executed, or these steps may be executed in another sequence.

S310: Removing finely divided parts.

First, a plurality of bone segmentation results generated by a plurality of different deep learning models may be obtained.

Figure 4:
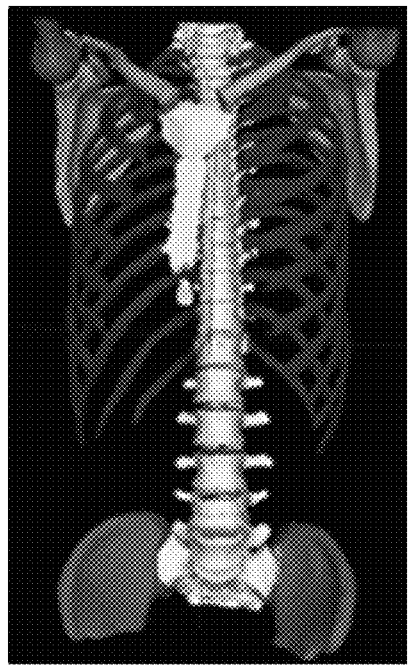
FIG. 4 is a schematic structural diagram of a bone 6 classification mask in an embodiment of the present application.
Figure 5:
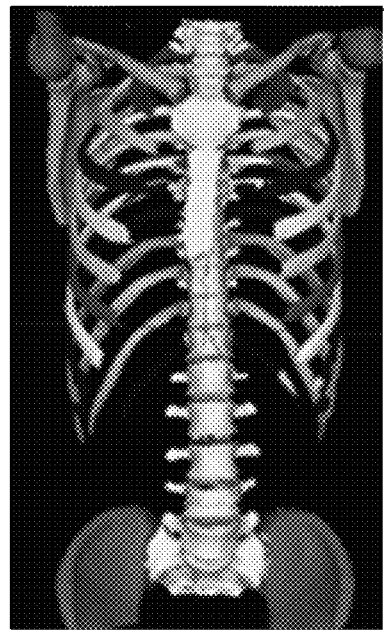
FIG. 5 is a schematic structural diagram of a rib 12 classification mask in an embodiment of the present application.
Figure 6:
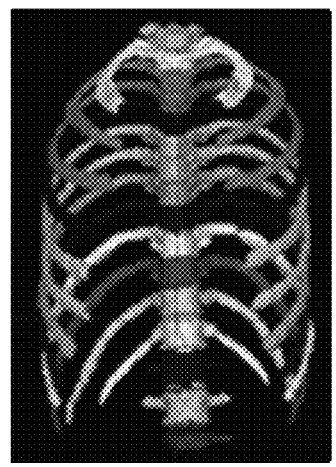
FIG. 6 is a schematic structural diagram of a rib instance segmentation mask in an embodiment of the present application.
Figure 7:
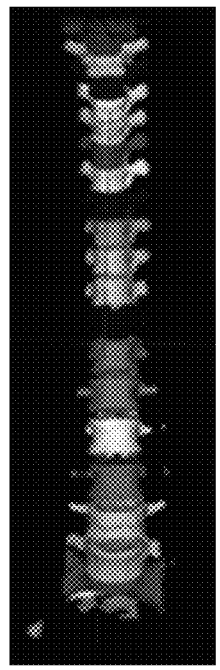
FIG. 7 is a schematic structural diagram of a vertebral segment instance segmentation mask in an embodiment of the present application.

For example, the plurality of bone segmentation results may include a bone 6 classification mask shown in FIG. 4, a rib 12 classification mask shown in FIG. 5, a rib instance segmentation mask shown in FIG. 6, a vertebral segment instance segmentation mask shown in FIG. 7, a vertebral segment key point, and an intervertebral disc plane. Alternatively, a bone segmentation result generated by another model (for example, another non-deep learning model) may be obtained, which is not limited in the embodiment of the present application.

Optionally, as for a clavicle, a sternum, and a scapula in the bone 6 classification mask, the following steps may be executed in sequence to remove finely divided parts.

Step a: Calculating a total volume V0 of each part, corresponding to each bone category, obtained through segmentation.

Step b: Calculating an independent connected domain of each part, and calculating a volume Vi of each independent connected domain.

Step c: Determining a bone part for which $Vi<0.2*V0$ as an independent finely divided part, and removing the finely divided part from the bone 6 classification mask.

V0 and Vi are both positive numbers.

Similarly, as for each vertebral segment in the vertebral segment instance segmentation mask, the foregoing step a to step c may be executed in sequence to remove independent finely divided parts from the vertebral segment instance segmentation mask.

Then, a processed clavicle, a processed sternum, and a processed scapula may be respectively configured to replace corresponded bone segmentation parts in the original bone 6 classification mask, to obtain a processed bone 6 classification mask. Three bone fragments, are removed from the processed bone 6 classification mask. The processed bone 6 classification mask may be recorded as S1-R1.

Similarly, a processed vertebral segment instance segmentation mask is recorded as S1-R2.

S320: Calculating a front-back partition interface and a left-right partition interface.

For example, a sternum and a vertebra may be selected from S1-R1, a center point C1 configured to segment the sternum is calculated, and an upper half region of the vertebra is segmented. A center point C2 of an upper half region (equivalent to an upper quarter of region of the original vertebra segmented) and a center point C3 of a lower half region (equivalent to a second quarter region of the original vertebra segmented from top to bottom) are calculated.

On a basis that C1, C2, and C3 are coplanar, a left-right segmentation plane lr_plane, namely, the left-right partition interface may be calculated.

For another example, the center point C1 and the center point C2 may be connected to obtain a line segment C1-C3. A 0.4 quantile C4 close to C3 in the line segment C1-C3 is calculated, and a fb_plane that passes through the quantile C4 and is perpendicular to the lr_plane is calculated, and the fb_plane is a front-back segmentation plane, namely, the front-back partition interface.

It should be noted that, the fb_plane is calculated by using a direction vector or a normal vector of the lr_plane. For a specific calculation algorithm, reference may be made to content related to solid geometry in the prior art, and details are not described herein again.

Figure 8:
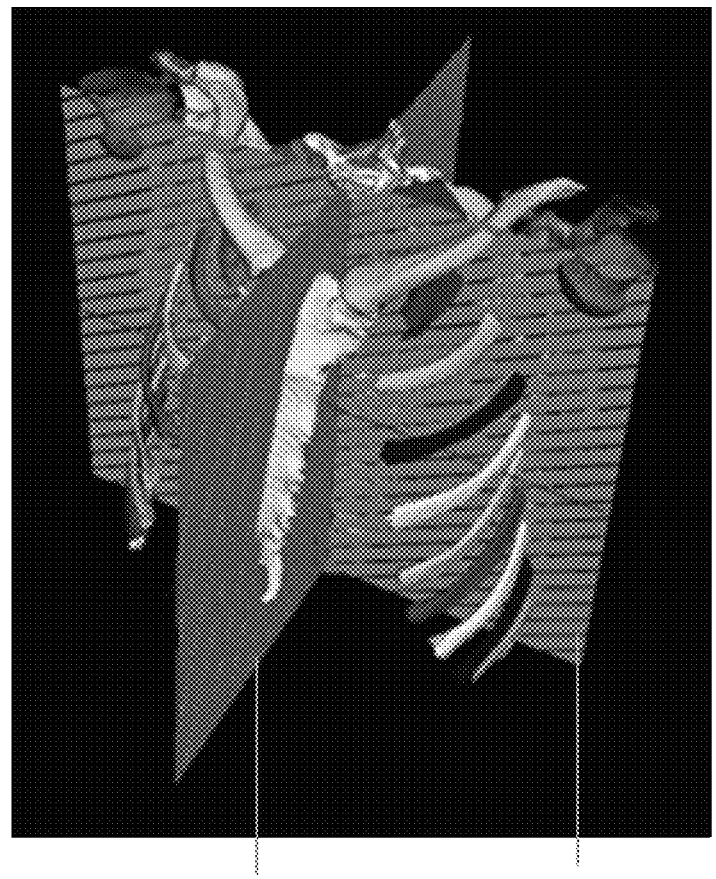
FIG. 8 is a front view of a left-right partition interface and a front-back partition interface in an embodiment of the present application.
Figure 9:
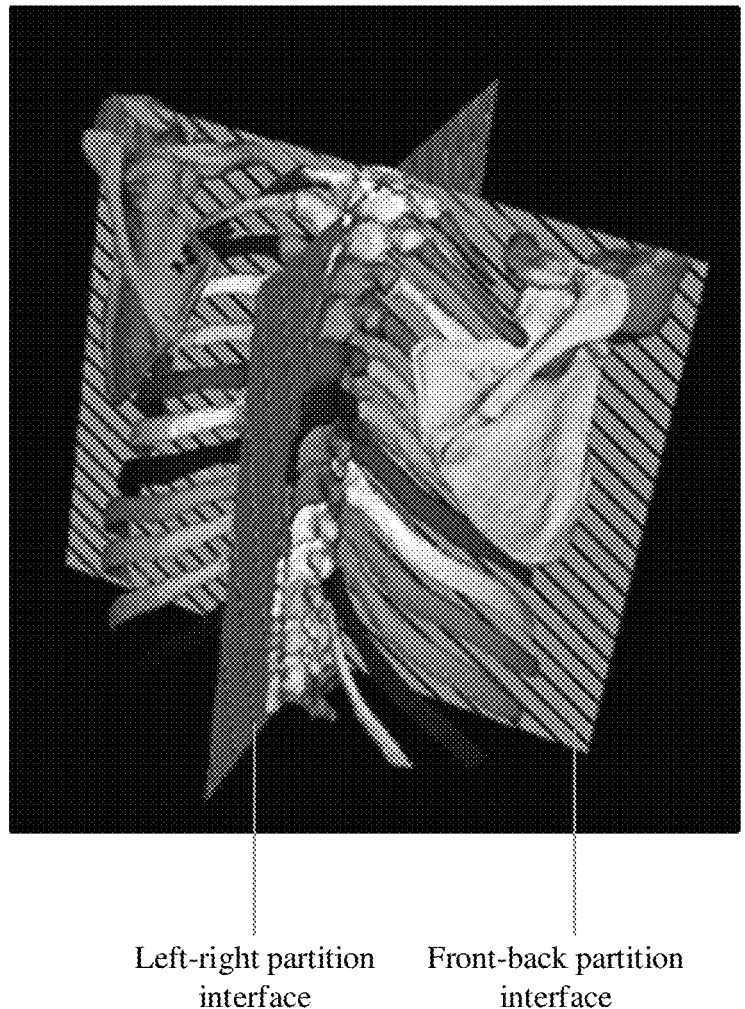
FIG. 9 is a rear view of a left-right partition interface and a front-back partition interface in an embodiment of the present application.

The left-right partition interface and the front-back partition interface obtained in the foregoing embodiment may be specifically shown in both FIG. 8 and FIG. 9. FIG. 8 is a front view, and FIG. 9 is a rear view.

Optionally, a position relationship between any point in the space and a plane may be calculated according to the lr_plane and the fb_plane by using a plane equation, and front-back and left-right position relationships between any point in the space and the plane may be output. According to this method, the front-back and left-right position relationships, recorded as S2-R1, may be used as a position of any point in the space to determine an interface.

S330: Mapping a rib instance.

In actual application, there is a difference between the rib instance segmentation mask and the bone 6 classification mask in segmentation. Instance information in the rib instance segmentation mask needs to be mapped to the bone 6 classification mask (a segmented rib in the bone 6 classification mask), and cross color that easily occurs on the rib anterior segment in the rib instance segmentation mask may also be corrected during the mapping.

For example, different instance labels may be configured to indicate different ribs in the rib instance segmentation mask. Generally, it is assumed that different ribs have different colors, that is, it may be considered that one instance label corresponds to one color (namely, one rib).

In this case, for each rib in the rib instance segmentation mask, if there are a plurality of parts corresponding to different instance labels on the rib, it may be considered that the rib is cross-colored.

Optionally, the rib instance may be mapped through the following step a to step d.

Step a: Performing an expansion operation with the core of [5,5,5] for the rib instance segmentation mask (in order to connect discontinuous color blocks that possibly exist on a same rib, to establish a complete connected relationship), to obtain an expanded rib instance S3-R1.

Figure 10:
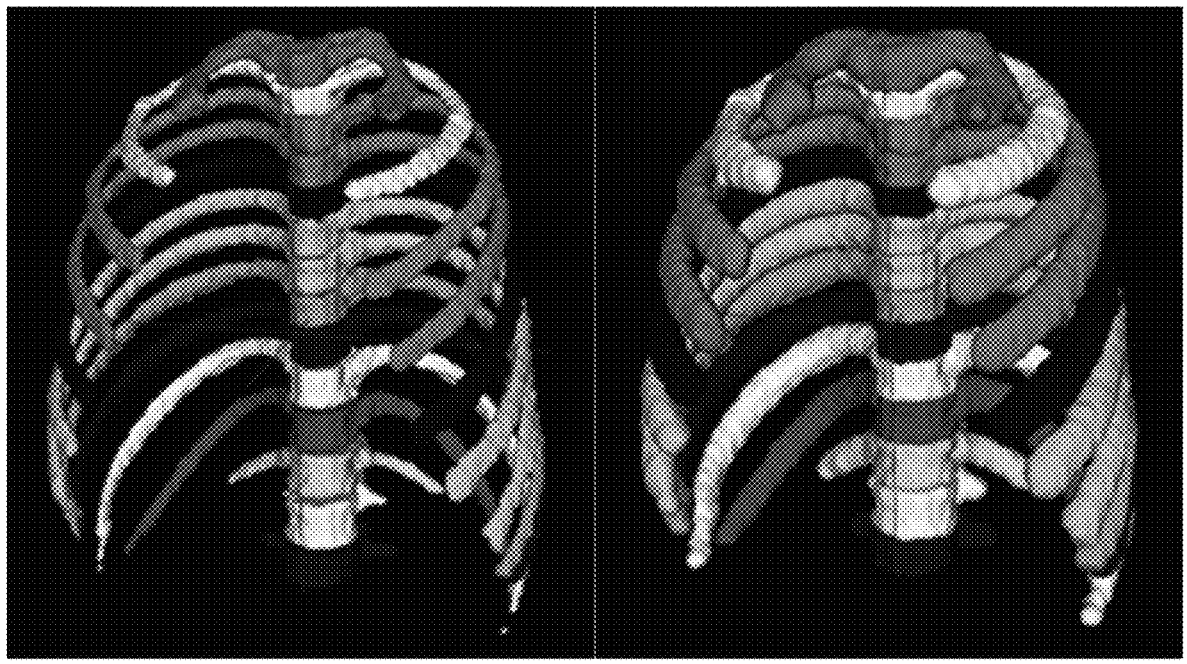
FIG. 10 is a schematic block diagram of an expansion operation in an embodiment of the present application.

As shown in FIG. 10, the left part in the FIG. 10 is the rib instance segmentation mask, and the right part in the FIG. 10 is the expanded rib instance S3-R1.

Step b: Performing a connected domain operation on a rib part in the bone 6 classification mask, a volume threshold is a volume of 50 pixels; sorting volumes in a result (of the connected domain operation) in descending order; performing an opening operation with the core of [1,1,1] for a connected domain in an upper region (in order to disconnect common segmentation adhesion between ribs in the bone 6 classification mask to make each rib located in an independent connected domain); performing a connected domain operation for a result (of the opening operation) again (in this case, each rib is located in an independent connected domain in the expected output, and a case in which adjacent ribs are located in a same connected domain due to adhesion does not exist); recording a result as S3-R2; and labeling the first rib in the result as Li (that is, label information of the rib is Li), and i is a positive integer.

Figure 11:
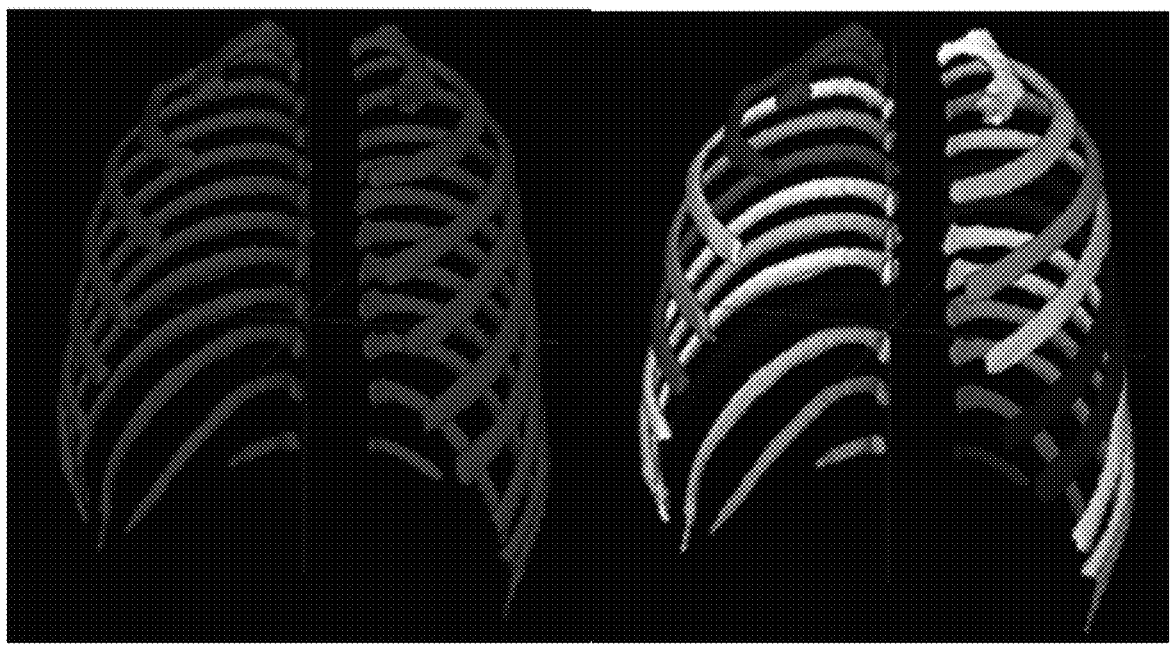
FIG. 11 is a schematic block diagram of a connected domain operation in an embodiment of the present application.
Figure 12:
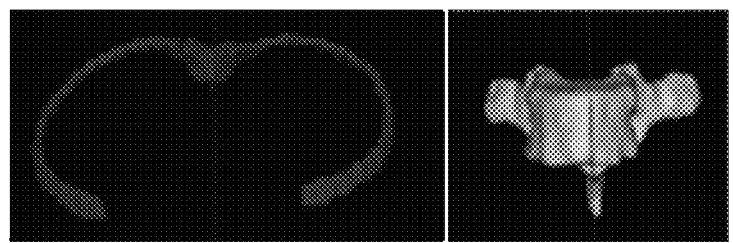
FIG. 12 is a schematic diagram of a rib instance and vertebral segment corresponding to the rib instance in an embodiment of the present application.

As shown in FIG. 11, the left part in the FIG. 11 is the rib part in the bone 6 classification mask, and the right part in the FIG. 11 is S3-R2 obtained after the processing by Step b.

Step c: Masking S3-R1 with S3-R2. In this case, a segmentation image S3-R3 to which rib instance information is mapped may be obtained. Cross color easily occurs on the rib anterior segment of the rib instance (for example, S3-R1). Therefore, independent ribs (obtained by masking S3-R3 with each independent label on S3-R2) are selected in sequence from S3-R3, and color (label information is Li) distribution on the independent ribs is calculated. If there is only one color, it indicates that the instance information is normal. If there are a plurality of colors, a volume corresponding to each color is calculated. A volume corresponding to a color i is set to be Vi, and a volume corresponding to a color imax whose volume is the largest is set to be Vmax. All colors i whose volumes Vi meet Vi≤Vmax are all set to be the color imax (to remove small labels on the rib, and the small labels may indicate cross color). The S3-R3 after this processing may be recorded as S3-R4.

A mapping relationship between label information Li, instance information Ii, position information Posi, and connected domain volume information Vi may be stored and recorded as S3-R5.

Posi, Vi, and Vmax are all positive numbers.

The masking in the foregoing step c may refer to a mask operation, that is, only an image within an effective region range of an image B is retained in an image A, and the other regions are set as the background (it may be considered that a filter with B as a contour is added to A), and this operation may be indicated by masking A with B.

Step d: Performing a region growing operation by using S3-R4 as a seed and the rib part in the bone 6 classification mask as a track, filling the entire rib part with rib label information to obtain a complete rib label segmentation result, and recording the result as S3-R6.

Morphological operations such as the expansion operation, the connected domain operation, the opening operation, and the region growing operation in the foregoing embodiment, may refer to the prior art, and details are not described in the embodiment of the present application.

S340: Determining sequence of a rib.

In the embodiment of the present application, classification information of the rib 12 classification mask may also be screened, and classification information with the highest confidence is selected to determine an actual sequence Oi of each rib. Then, a mapping relationship between the rib instance information Ii, the rib label information Li, and the actual rib sequence Oi may be derived based on sequence information in the rib instance information, and may perform necessary correction.

Optionally, the rib sequence may be determined through the following step a to step e.

Step a: Transforming the rib label segmentation result S3-R6 based on the mapping relationship between the rib instance information Ii and the rib label information Li in S3-R5 to obtain a rib instance segmentation result, and recording the result as S4-R1.

Step b: Extracting each rib instance from S4-R1 in sequence, masking a corresponding rib in the rib 12 classification mask (namely, a classification and segmentation of the rib) with each rib instance, to obtain a classification and segmentation of each rib instance, and calculating cross entropy of the classification and segmentation (of each rib instance).

Step c: After obtaining cross entropy (of the classification and segmentation) of all rib instances through the step b, sorting the ribs in descending order of volumes, and obtaining category information of first 5 rib instances with the smallest cross entropy (namely, the highest classification and segmentation consistency) to obtain a mapping relationship between a selected rib instance Is and an actual category (or an actual sequence) Os (namely, a rib in the rib instance Is corresponds to actual nth rid), and s is a positive integer.

Step d: Deriving categories of all rib instances based on the sequence of the rib instances and the actual category of the selected rib instance. For example, the rib instances are numbered as 12 to 1 (from top to bottom). Assuming that an instance 2 is selected, an actual category corresponding to the instance 2 is the eleventh rib. Therefore, all rib instances correspond to the first rib to the twelfth rib (from top to bottom), respectively. The correspondences are stored in S3-R5, and recorded as S4-R2.

Step e: Correcting classification information in the rib 12 classification mask before the classification information is output because there is a certain percentage of systematic errors in the classification information (for example, ribs 1 to 11 may be respectively classified as ribs 2 to 12 by mistake).

For example, the following logic may be set.

If a total quantity of ribs is less than or equal to 12 and a label of the first rib is not 1, category labels of all ribs are shifted until the first rib is rib 1. For example, ribs −1 to 9 are shifted to be ribs 1 to 11, respectively. A result obtained after the correction is recorded as S4-R3.

S350: Determining sequence of a vertebra.

Optionally, category information of all vertebral segments may be given based on the correspondence between the selected rib instance Is, the rib instance segmentation mask, and the vertebral segment instance segmentation mask.

Optionally, the vertebra sequence may be determined through the following step a and step b.

Step a: Selecting the selected rib instance Is (shown in the left part in FIG. 12), masking the vertebral segment instance segmentation mask with the selected rib instance to obtain a common vertebral segment of the selected rib instance (or a vertebral segment corresponding to the rib instance, shown in the right part in FIG. 12), collecting statistics on label information of the vertebral segment, and selecting a primary label of the vertebral segment as a label of the vertebral segment, that is, obtaining a correspondence between a vertebral segment label and actual sequence of the vertebral segment.

For example, a label of the common vertebral segment of the rib instance is 13, a label of a rib instance corresponding to the vertebral segment is 3, and an actual sequence number of the rib obtained by using S4-R3 is third. Therefore, it may be determined that the vertebral segment 13 (that is, the vertebral segment whose label is 13) is the third thoracic vertebra.

Step b: Deriving actual sequences of labels of all vertebral segment according to a label of a selected vertebral segment and actual sequence thereof in combination with a vertebral segment sequence in the vertebral segment instance segmentation mask. An actual sequence of labels of all vertebral segment determined may be recorded as S5-R1.

S360: Correcting the logic.

Optionally, an existing mapping relationship S4-R3 between a rib label, a rib instance, and a rib sequence as well as an existing mapping relationship S5-R1 between a vertebra label and a vertebra sequence may be corrected, and a correction result is combined into the processed bone segmentation mask (S1-R1) to distinguish between a left part and a right part of a rib, a clavicle, and a scapula and relabel the rib, the clavicle, and the scapula.

For example, the logic may be corrected through the following step a to step d.

Step a: An actual medical image rarely includes a cervical rib, and the cervical rib is not the first rib but a small rib-like bone grown from a cervical vertebra, and does not belong to a scope of ribs 1 to 12 in the strict sense. Since the cervical rib is like a rib in shape and easily causes a problem that the cervical rib is easily incorrectly classified as the first rib in results of a rib segmentation, a rib instance segmentation, and the like, which further results in a systematic error in overall rib segmentation and classification.

Therefore, rib information and vertebra information that have been classified may be extracted, statistics on a volume V1 of the first rib and a volume V42 of the first thoracic vertebra are collected. The first rib whose volume V1 meets V1<0.2×V42 may be determined as a cervical rib. In this case, overall sequence information of the rib and the vertebra may be shifted backwards by one position (that is, the original second rib is changed to the first rib, and the original second thoracic vertebra is changed to the first thoracic vertebra, and so on).

Step b: as for a rib whose sequence is determined (for example, the rib in S4-R3) and the scapula and the clavicle in S1-R1, Calculating a position of each point, calculating left-right distribution categories based on the position of a center point (for example, may be calculated according to S2-R1), and relabeling each bone part based on a calculation result and a preset labeling rule in the following Table 1.

Step c: Relabeling each vertebral segment based on a vertebral segment label (for example, the vertebral segment instance segmentation mask), vertebral segment sequence information (for example, S5-R1), and the preset labeling rule in Table 1.

Step d: Replacing corresponding bone segmentation in original S1-R1 with the relabeled rib, the relabeled vertebra, the relabeled scapula, and the relabeled clavicle respectively to obtain an initial bone segmentation result. The initial bone segmentation result may be labeled as S6-R1.

TABLE 1

Preset labeling rule

| Rib | Scapula | Sternum | Clavicle | Other bones | Vertebra |
|---|---|---|---|---|---|
| Left ribs 1 to 12: {1, 12} | Left scapula: 31 | 27 | Left clavicle: 33 | 29 | Cervical vertebra 1 to 7: {35, 41} Thoracic vertebra 1 to 12: {42, 53} Lumbar vertebra 1 to 5: {54, 58} Sacrum coccyx: {59} |
| Right ribs 1 to 12: {13, 24} | Right scapula: 32 | | Right clavicle: 34 | | |

S370: Restoring a sacrum coccyx.

In actual application, a segmentation effect of a vertebral segment instance segmentation mask at a sacrum coccyx is usually poor. As a result, directly using the segmentation at the sacrum coccyx will affect the effect of a final segmentation result. Therefore, the sacrum coccyx may be restored by using a vertebra in a bone 6 classification mask, a vertebral segment key point, and an intervertebral disc plane.

For example, the sacrum coccyx may be restored through the following step a to step d.

Step a: Obtaining segmentation of the fourth lumbar vertebra by using S6-R1, and obtaining planar information of an intervertebral disc plane below the fourth lumbar vertebra by using the intervertebral disc plane.

Step b: Mapping the bone 6 classification mask to a physical space, calculating a distance (distance Map) between each point in a vertebra region and a plane where an intervertebral disc below the fourth lumbar vertebra is located, and selecting a region with a distance being negative (namely, a region located below the plane where the intervertebral disc is located) to obtain a segmentation mask of a part below the plane where the intervertebral disc is located. The segmentation mask may cover segmentation of the fifth lumbar vertebra and the sacrum coccyx.

Figure 13:
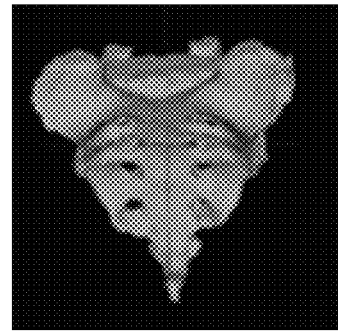
FIG. 13 is a schematic block diagram of segmentation of sacrum coccyx in an embodiment of the present application.

Step c: Subtracting a segmentation mask of the fifth lumbar vertebra in S6-R1 from the segmentation mask obtained in step b to obtain a result, and performing an opening operation (to remove distribution of finely divided parts) with the core of [1,1,1] for the result to obtain segmentation of the sacrum coccyx, as shown in FIG. 13.

Step d: Combining the result (namely, the segmentation of the sacrum coccyx) obtained in step c into S6-R1 to obtain a final target bone segmentation result.

Figure 14:
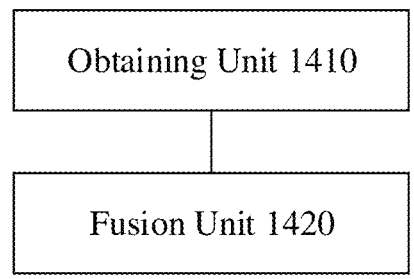
FIG. 14 is a schematic block diagram of an apparatus of processing image according to an embodiment of the present application.

FIG. 14 is a schematic block diagram of an apparatus 1400 of processing image according to an embodiment of the present application. It should be understood that, the apparatus 1400 shown in FIG. 14 is only an example, and the apparatus 1400 in the embodiment of the present application may further include other modules or units.

It should be understood that, the apparatus 1400 can execute each step in the methods illustrated in FIG. 2 and FIG. 3. To avoid repetition, details are not described herein again.

In a possible implementation of the present application, the apparatus includes an obtaining unit 1410 and a fusion unit 1420.

The obtaining unit 1410 is configured to obtain an initial bone segmentation result. The initial bone segmentation result includes a plurality of bone segmentation results generated by a plurality of different deep learning models.

The fusion unit 1420 is configured to fuse the initial bone segmentation result based on characteristics of and correspondences between the plurality of bone segmentation results in the initial bone segmentation result, to obtain a target bone segmentation result.

It should be understood that, the apparatus 1400 of processing image herein is embodied in a form of a function module. The term "module" herein may be implemented in a form of software and/or hardware, which is not specifically limited. For example, the "module" may be a software program, a hardware circuit, or a combination thereof that implement the foregoing functions. The hardware circuit may include an Application Specific Integrated Circuit (ASIC), an electronic circuit, a processor configured to execute one or more software or firmware programs (for example, a shared processor, a dedicated processor, or a group processor), a memory, a combined logic circuit, and/or any other suitable components that support the described functions.

In an example, the apparatus 1400 of processing image provided by the embodiment of the present application may be a processor or a chip, The processor or the chip is configured to perform the methods described in the embodiments of the present application.

Figure 15:
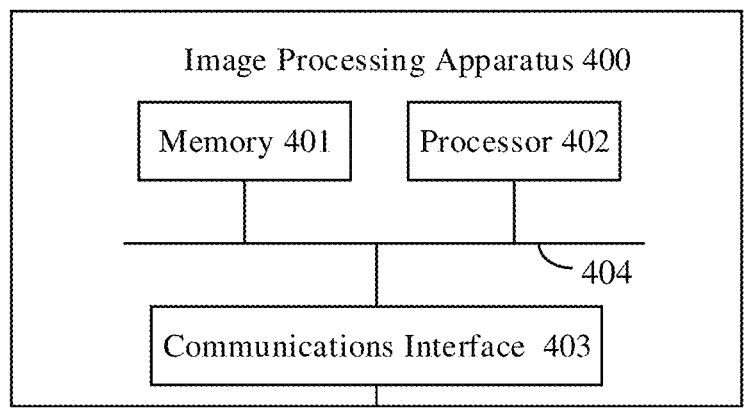
FIG. 15 is a schematic block diagram of an apparatus of processing image according to another embodiment of the present application.

FIG. 15 is a schematic block diagram of an apparatus 400 of processing image according to an embodiment of the present application. The apparatus 400 shown in FIG. 15 includes a memory 401, a processor 402, a communications interface 403, and a bus 404. Communication connections between the memory 401, the processor 402, and the communications interface 403 are implemented through the bus 404.

The memory 401 may be a Read-Only Memory (ROM), a static storage device, a dynamic storage device, or a Random Access Memory (RAM). The memory 401 may store a program. When the program stored in the memory 401 is executed by the processor 402, the processor 402 is configured to execute steps of the methods of processing image in the embodiments of the present application, for example, may perform the steps of the embodiments illustrated in FIG. 2 and FIG. 3.

The processor 402 may be a general-purpose Central Processing Unit (CPU), a microprocessor, an ASIC, or one or more integrated circuits, in order to be configured to execute related program to implement the methods of processing image in the method embodiments of the present application.

Alternatively, the processor 402 may also be an integrated circuit chip with a signal processing capability. In an implementation process, the steps of the methods of processing image in the embodiments of the present application may be performed by using an integrated logic circuit of hardware of the processor 402 or instructions in a software form.

Alternatively, the processor 402 may be a general-purpose processor, a Digital Signal Processor (DSP), an ASIC, a Field Programmable Gate Array (FPGA) or another programmable logic device, a discrete gate or a transistor logic device, or a discrete hardware component, and may implement or execute the methods, steps, and logical block diagrams that are disclosed in the embodiments of the present application. The general-purpose processor may be a microprocessor, or the processor may be any conventional processor or the like.

Steps of the methods disclosed with reference to the embodiments of the present application may be directly executed and accomplished through a hardware decoding processor, or may be executed and accomplished by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory 401. The processor 402 reads information from the memory 401, and in combination with hardware of the processor 402, performs functions that need to be performed by the units included in the apparatus of processing image in the embodiments of the present application, or executes the methods of processing image in the method embodiments of the present application, for example, may execute the steps or functions in the embodiments illustrated in FIG. 2 and FIG. 3.

The communications interface 403 may use a transceiver apparatus including, but not limited to, a transceiver to implement communication between the apparatus 400 and another device or a communications network.

The bus 404 may include a channel that transmits information between various components (for example, the memory 401, the processor 402, and the communications interface 403) of the apparatus 400.

It should be understood that, the apparatus 400 provided in the embodiment of the present application may be a processor or a chip, in order to be configured to execute the methods of processing image described in the embodiments of the present application.

It should be understood that, in the embodiment of the present application, the processor may be a CPU. Alternatively, the processor may also be another general-purpose processor, a DSP, an ASIC, a FPGA or another programmable logic device, a discrete gate or a transistor logic device, or a discrete hardware component, or the like. The general-purpose processor may be a microprocessor, or the processor may be any conventional processor or the like.

It should be understood that, the term "and/or" in this specification merely describes an association relationship for describing associated objects and represents that three relationships may exist. For example, A and/or B may represent the following three cases: Only A exists, both A and B exist, and only B exists. A and B may be singular or plural. In addition, the character "/" in this specification generally represents an "or" relationship between the front associated object and the back associated object, and may represent an "and/or" relationship, which may be understood with reference to the context.

In the present application, "at least one" means one or more, and "plurality" means at least two. "At least one of the following" or a similar expression thereof indicates any combination of the following, and includes any combination of one or more of the following. For example, at least one of a, b, or c may indicate: a, b, c, a-b, a-c, b-c, or a-b-c, and a, b, and c may be singular or plural.

It should be understood that, in the embodiments of the present application, sequence numbers of the foregoing processes do not mean execution sequences. The execution sequences of the processes should be determined according to functions and internal logic of the processes, and should not be construed as any limitation on the implementation processes of the embodiments of the present application.

The foregoing descriptions are merely preferable embodiments of the present application, but are not intended to limit the present application. Any modification, equivalent replacement, and the like made without departing from the spirit and principle of the present application shall fall within the protection scope of the present application.

What is claimed is:

1. A method of processing images, comprising:
   obtaining an initial bone segmentation result, wherein the initial bone segmentation result comprises a plurality of bone segmentation results generated by a plurality of different deep learning models; and
   fusing the initial bone segmentation result based on characteristics of and correspondences between the plurality of bone segmentation results in the initial bone segmentation result, to obtain a target bone segmentation result,
   wherein the initial bone segmentation result comprises at least one of a bone classification result, a rib classification result, a rib instance segmentation result, a vertebral segment instance segmentation result, a vertebral segment key point, and an intervertebral disc plane.

2. The method according to claim 1, wherein in a case that the initial bone segmentation result comprises the bone classification result and the rib instance segmentation result, the fusing the initial bone segmentation result based on characteristics of and correspondences between the plurality of bone segmentation results in the initial bone segmentation result, to obtain a target bone segmentation result comprises:
   mapping the rib instance segmentation result to a rib part in the bone classification result, to obtain a candidate bone classification result; and
   determining the target bone segmentation result according to the candidate bone classification result.

3. The method according to claim 2, wherein in a case that the initial bone segmentation result comprises the rib classification result, the determining the target bone segmentation result according to the candidate bone classification result comprises:

determining, according to the rib classification result, the candidate bone classification result, and a correspondence between the rib classification result and the candidate bone classification result, first initial label information of each rib in the target bone segmentation result, wherein the first initial label information is configured to indicate each rib and sequence thereof.

4. The method according to claim 3, wherein in a case that the initial bone segmentation result comprises the vertebral segment instance segmentation result, the method further comprises:
determining, according to the rib instance segmentation result and the vertebral segment instance segmentation result, second initial label information of each vertebral segment in the target bone segmentation result, wherein the second initial label information is configured to indicate each vertebral segment and sequence thereof.

5. The method according to claim 4, further comprising:
correcting the first initial label information and the second initial label information, to obtain first label information and second label information, respectively, wherein the first label information is configured to indicate each rib obtained after correction and sequence thereof, and the second label information is configured to indicate each vertebral segment obtained after correction and sequence thereof.

6. The method according to claim 5, further comprising:
relabeling each rib in the first label information, each vertebral segment in the second label information, a scapula, a sternum, and a clavicle in the target bone segmentation result according to a preset labeling rule.

7. The method according to claim 6, wherein in a case that the initial bone segmentation result comprises the vertebral segment key point and the intervertebral disc plane, the method further comprises:
restoring a sacrum coccyx in the target bone segmentation result according to a vertebra in the bone classification result, the vertebral segment key point, and the intervertebral disc plane.

8. The method according to claim 1, further comprising:
calculating a volume of an independent connected domain corresponding to each part in the bone classification result and the vertebral segment instance segmentation result; and
removing a part whose volume does not meet a preset condition.

9. The method according to claim 8, further comprising:
determining, according to a sternum and a vertebra in the bone classification result, each bone in the target bone segmentation result, a front-back partition interface, and a left-right partition interface, wherein the front-back partition interface is configured to divide each bone into a front part and a back part, and the left-right partition interface is configured to divide each bone into a left part and a right part.

10. An apparatus of processing images, comprising a processor and a memory, wherein the memory is configured to store program instructions, and the processor is configured to invoke the program instructions to obtain an initial bone segmentation result, wherein the initial bone segmentation result comprises a plurality of bone segmentation results generated by a plurality of different deep learning models; and fuse the initial bone segmentation result based on characteristics of and correspondences between the plurality of bone segmentation results in the initial bone segmentation result, to obtain a target bone segmentation result; and the initial bone segmentation result comprises at least one of a bone classification result, a rib classification result, a rib instance segmentation result, a vertebral segment instance segmentation result, a vertebral segment key point, and an intervertebral disc plane.

11. The apparatus according to claim 10, wherein in a case that the initial bone segmentation result comprises the bone classification result and the rib instance segmentation result, the processor is further configured to invoke the program instructions to map the rib instance segmentation result to a rib part in the bone classification result, to obtain a candidate bone classification result; and determine the target bone segmentation result according to the candidate bone classification result.

12. The apparatus according to claim 11, wherein in a case that the initial bone segmentation result comprises the rib classification result, the processor is further configured to invoke the program instructions to determine, according to the rib classification result, the candidate bone classification result, and a correspondence between the rib classification result and the candidate bone classification result, first initial label information of each rib in the target bone segmentation result, wherein the first initial label information is configured to indicate each rib and sequence thereof.

13. The apparatus according to claim 12, wherein in a case that the initial bone segmentation result comprises the vertebral segment instance segmentation result, the processor is further configured to invoke the program instructions to determine, according to the rib instance segmentation result and the vertebral segment instance segmentation result, second initial label information of each vertebral segment in the target bone segmentation result, wherein the second initial label information is configured to indicate each vertebral segment and sequence thereof.

14. The apparatus according to claim 13, wherein the processor is further configured to invoke the program instructions to correct the first initial label information and the second initial label information, to obtain first label information and second label information, respectively, wherein the first label information is configured to indicate each rib obtained after correction and sequence thereof, and the second label information is configured to indicate each vertebral segment obtained after correction and sequence thereof.

15. The apparatus according to claim 14, wherein the processor is further configured to invoke the program instructions to relabel each rib in the first label information, each vertebral segment in the second label information, a scapula, a sternum, and a clavicle in the target bone segmentation result according to a preset labeling rule.

16. The apparatus according to claim 15, wherein in a case that the initial bone segmentation result comprises the vertebral segment key point and the intervertebral disc plane, the processor is further configured to invoke the program instructions to restore a sacrum coccyx in the target bone segmentation result according to a vertebra in the bone classification result, the vertebral segment key point, and the intervertebral disc plane.

17. The apparatus according to claim 10, wherein the processor is further configured to invoke the program instructions to calculate a volume of an independent connected domain corresponding to each part in the bone classification result and the vertebral segment instance segmentation result; and remove a part whose volume does not meet a preset condition.

18. The apparatus according to claim 10, wherein the processor is further configured to invoke the program instructions to determine, according to a sternum and a vertebra in the bone classification result, each bone in the target bone segmentation result, a front-back partition interface, and a left-right partition interface, wherein the front-back partition interface is configured to divide each bone into a front part and a back part, and the left-right partition interface is configured to divide each bone into a left part and a right part.

* * * * *